Dec. 25, 1956  E. JEREMIAH  2,775,334
CAN UNSCRAMBLER
Filed Nov. 24, 1953  2 Sheets-Sheet 1
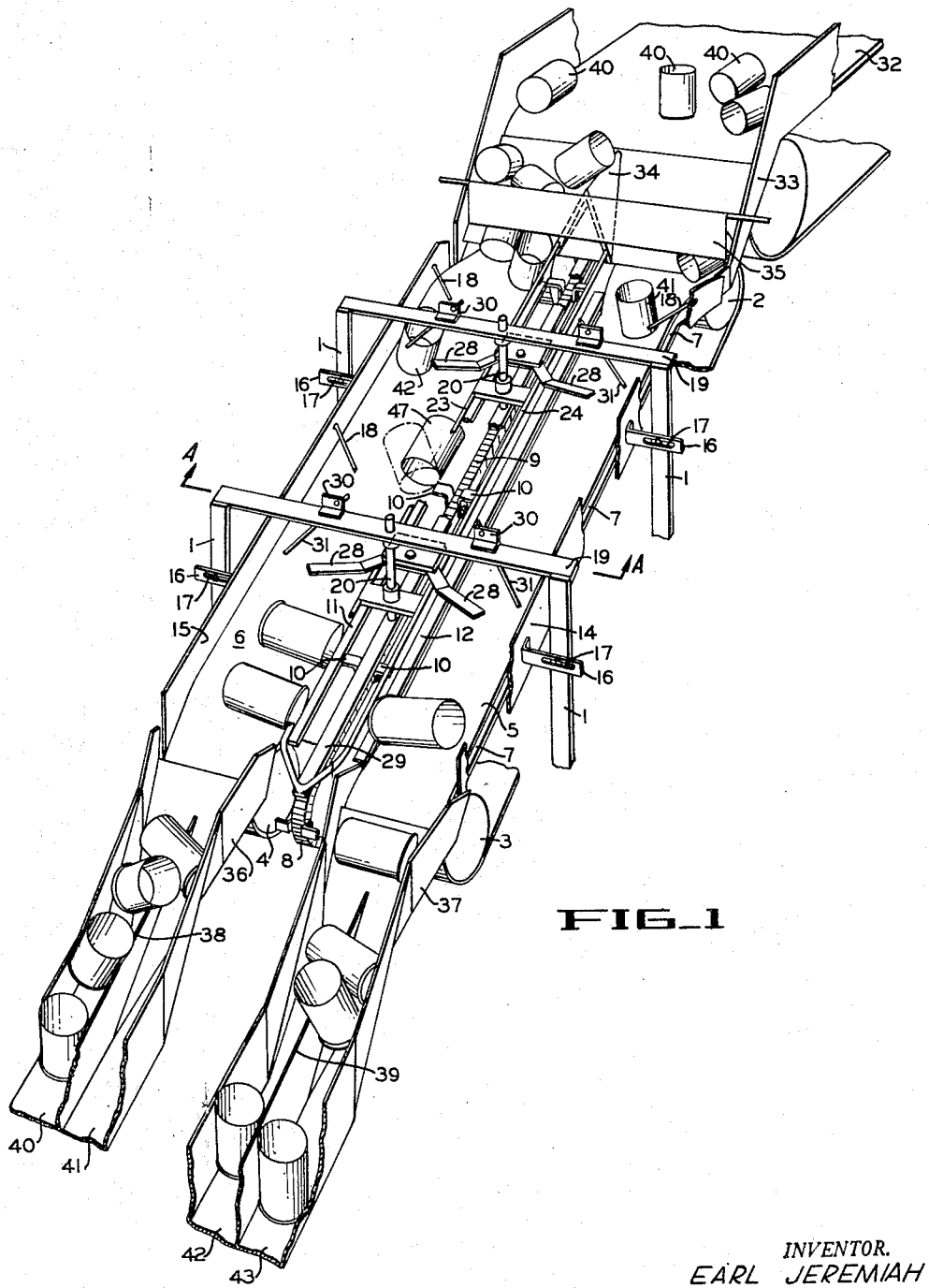
FIG_1
INVENTOR.
EARL JEREMIAH
BY
Mellin and Hanscom
ATTORNEYS Dec. 25, 1956  E. JEREMIAH  2,775,334
CAN UNSCRAMBLER
Filed Nov. 24, 1953  2 Sheets-Sheet 2
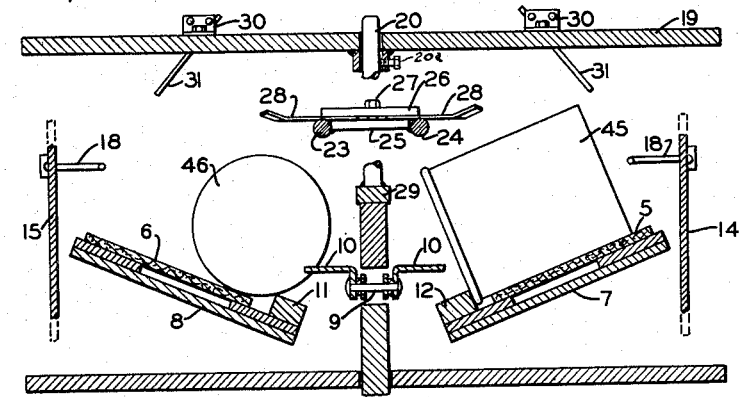
FIG_2
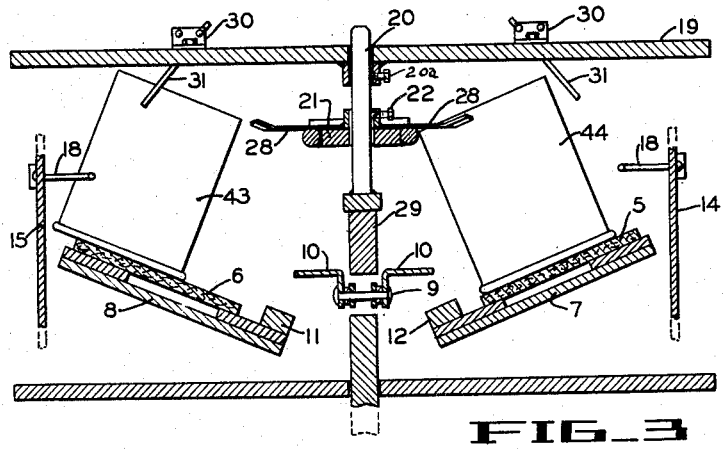
FIG_3
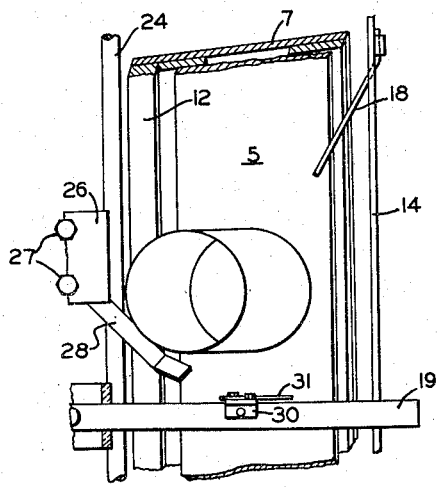
FIG_4
INVENTOR.
EARL JEREMIAH
BY
Mellin and Hanscom
ATTORNEYS United States Patent Office 2,775,334
Patented Dec. 25, 1956

2,775,334

CAN UNSCRAMBLER

Earl Jeremiah, Hayward, Calif., assignor to United Can and Glass Company, Hayward, Calif., a corporation of Delaware Application November 24, 1953, Serial No. 394,053

12 Claims. (Cl. 198—30)

This application is a companion application to my copending application Serial No. 394,183, filed November 24, 1953, and entitled "Method and Apparatus for Handling Cans."

This invention relates to a machine for unscrambling or aligning empty cans; that is, for receiving cans having their bottoms affixed but their tops open at a loading station in a condition of random orientation and delivering them at a delivery station in predetermined, aligned position.

In can-making plants and canneries it is common to store empty cans having only the bottoms affixed thereto prior to filling the cans. In some instances, these cans will be in a condition of random orientation; in such case, it is necessary to orient the cans with their open ends up before placing them on the can lines to be filled.

Manual alignment of a mass of cans before placing the cans on the can lines is both expensive and time consuming. Machines heretofore in use to perform this operation have been inefficient or expensive and frequently undependable in their operation, requiring continual adjustment or even shutdown for major repairs.

It is the principal object of the present invention to provide an improved machine for receiving a mass of empty cans at a loading station in a condition of random orientation and to deliver them to a conveyor or plurality of conveyors oriented with their open ends up.

It is a further object of the invention to provide a machine for orienting or aligning cans, which is dependable and continuous in its operation, and which involves a minimum of moving mechanical parts which are likely to require frequent repair or replacement.

A still further object of the present invention is to provide a machine wherein the turning lugs for the cans move in the same direction as the cans move through the machine but at a slightly lower speed thus permitting higher can speeds and hence greater volume per machine without increasing can damage due to high relative speeds between cans and lugs.

Various other objects of the present invention will be apparent from the following description taken in connection with the accompanying drawings, wherein:

Fig. 1 is a perspective view of a can aligning device embodying the principles of my invention.

Figs. 2 and 3 are sectional views taken on the line A—A of Fig. 1 showing cans in various conditions of orientation and how they will be affected by the orienting guides shown at A—A in Fig. 1.

Fig. 4 is a partial plan view of one of the conveyor belts adjacent one of the orientation stations.

Referring to the accompanying drawings wherein similar reference numerals are used to designate similar parts throughout the drawings, there is shown a can aligning device comprising a frame (only a portion of which is shown) represented by the upright members 1. Supported on said frame are four conveyor rollers only three of which are shown at 2, 3 and 4 respectively. Two parallel conveyor belts 5 and 6 are supported on said rollers, belt 5 being trained over rollers 2 and 3, and belt 6 being trained over roller 4 and the roller not shown. The upper reaches of said belts 5 and 6 are supported by a pair of inclined plates 7 and 8, the plates being inclined in such manner that the slope of the belts supported thereon is downward toward the center of the device. Plates 7 and 8 and necessarily the belts supported thereon are adjustable horizontally toward and away from the center of the machine.

In the center of the machine adjacent the inner ends of the belts there is a conveyor chain 9 having spaced lugs 10 mounted thereon, said lugs extending horizontally in either direction from the chain. As best shown in Figs. 2 and 3, lugs 10 on the upper reach of said chain extend outwardly toward the belts 5 and 6 and are spaced slightly above the inner edge thereof. Mounted on the plates 7 and 8 adjacent the inner edge of the belts 5 and 6 are two guide rails 11 and 12 the purpose of which will become apparent in the description to follow.

Adjacent the outer edge of each of the belts 5 and 6 are two side plates 14 and 15 each of which is supported by means of a plurality of brackets 16 attached thereto. Each of the brackets 16 has a slot 17 formed therein adapted to receive a bolt therethrough, said bolts being threaded into the upright frame members 1. It can be seen that by providing slots 17 the side rails 14 and 15 may be adjusted inwardly and outwardly with respect to the side edges of the belts 5 and 6 in order to accommodate cans of different sizes. Attached to the outer surface of the side rails 14 and 15, and extending diagonally through apertures in said sides, are a plurality of spring guide fingers 18 the purpose of which will be explained later.

A plurality of cross braces 19 are mounted to the upper ends of the uprights 1 and extend transversely above the belts 5 and 6. Slidably received in the center of each of these cross braces and adapted to be secured relative thereto by a set screw 20a is an upright member 20 the lower end of which is attached to member 29 supporting the chain conveyor 9. On each of these upright members 20 is a slidable bracket 21. As can be best seen in Fig. 3, this slidable bracket 21 is vertically adjustable with respect to the upright bracing member 20 and can be fastened in its adjusted position by means of a set screw 22. Fastened to the bracket members 21 are a pair of guide mounting rails 23 and 24 extending longitudinally of the device the full length thereof. Welded to the guide rails 23 and 24, forward of the vertical upright members 20 with respect to the direction of travel of the belts 5 and 6, is a plate 25. A guide bar 28 is fastened to said plate 25 by means of an upper clamping plate 26, said upper plate 26 being clamped to plate 25 by means of cap screws 27. Said guide bar 28 has a portion extending diagonally outward and forward in opposite directions from said guide rails 23 and 24 above the belts 5 and 6.

Fixedly attached to the crosspieces 19 are a plurality of brackets 30, one above the center of each of the belts on each of the crosspieces 19. Each of these brackets has attached thereto a spring finger 31 which extends downwardly and outwardly therefrom above the belts 5 and 6.

In the operation of the device, the unoriented cans 40 are delivered to the device by means of a conveyor 32, the cans drop off the end of conveyor 32 into the chute 33, said chute having a V-shaped divider 34 at the center thereof which delivers the cans relatively equally distributed to the two conveyor belts 5 and 6. A baffle plate 35 is provided above the delivery end of the chute 33 to prevent the cans from piling in multiple layers upon the belts 5 and 6.

As can best be seen in Fig. 1, a can such as the one shown at 41 adjacent the outer edge of the belt 5 will be forced inwardly toward the center of the belt by means of a spring finger 18. A can such as shown at 42 which is standing on its end, either the upper or lower end thereof, is guided outwardly by means of the guide 28 to engagement with the spring finger 31 which will tumble the can over on its side. The action of two cans resting on either their bottom or top when they contact the guide fingers 18, the guides 28, and the tumbler fingers 31 is also illustrated in the sectional view shown in Fig. 3 wherein the can labeled 43 is in engagement with the spring finger 18 and about to be moved inwardly on the belt 6, similarly the can 44 is ready to be guided outwardly by the guide 28 into engagement with the spring finger 31, and be tumbled thereby, onto its side.

If the can is delivered to the conveyor belt 5 and 6 already on its side, it will rest against either of the guide rails 11 and 12 in either of the positions shown in Fig. 2. The can labeled 45 is in the desired oriented position with its axis transverse of the belt 5 and 6. In this position the can will clear all of the guides 18, 28 and 31 and also the lugs 10 on the chain 9.

If the can is in the position illustrated by the can 46, the can will rest against the guide rail 11 and will be engaged by one of the lugs 10 on the chain 9. The conveyor belts 5 and 6 are driven at a linear speed relatively higher than the linear speed of chain 9, whereby the can under the influence of the conveyor belt 6 will overtake one of the lugs 10 and will be engaged thereby as shown by the can 47 in Fig. 1; upon such engagement the difference in the relative speeds of the lugs 10 and the belt 6 will cause the can to rotate about the lug as a pivot in the manner shown in the dotted lines and assume a position with its longitudinal axis transverse to the belt 6.

From the structure so far described, it may be seen that I have provided a device wherein a plurality of cans delivered to the device in random positions of orientation will issue from the device with all of the cans having their axes extending transverse to the belts 5 and 6. It can also be seen that the cans can travel through the machine at a high rate of speed but since the chain conveyor 9 and lugs 10 travel in the same direction as the cans the relative speed between them is small so that there will be little or no can damage from the cans striking the lugs.

At the delivery end of the unscrambling device there are provided two chutes 36 and 37, one for each of the belts 5 and 6, said delivery chutes being provided with balancing edges 38 and 39 respectively, said balancing edges being centered in said chutes. When the cans issue from the conveying belts, they will be supported at their midpoint by said balancing edges and will tend to turn with their open end up due to the unbalance of weight caused by the bottom being fixed to the can. The cans will ultimately issue on the delivery conveyors 40, 41, 42 and 43, all oriented with their open ends up.

While I have shown and described the preferred form of my invention, it is to be understood that various changes may be made in this construction by those skilled in the art without departing from the spirit of the invention as defined in the appended claims.

Having thus described my invention, what I claim and desire to secure by Letters Patent is:

1. A can-aligning machine comprising means for conveying cans along a defined path of travel, said means being inclined transversely to said path of travel, guide means adjacent the low side of the conveying means, and can turning means adjacent the guide means, said can turning means comprising a chain conveyor having lugs extending transversely therefrom for engaging cans having their axes parallel to the path of travel and turning them to a position with their axes perpendicular to the path of travel, said chain conveyor traveling at a speed less than the speed of said conveying means.

2. A can-aligning machine comprising means for conveying cans from a loading station to a delivery station and defining a path of travel, said conveying means being inclined transversely to said path of travel, a guide rail adjacent the low side of said conveying means whereby said cans tend to ride against said guide rail, said guide rail being shorter than the radius of the can whereby a can with its axis parallel to the guide rail will project further over the guide rail than a can with its axis perpendicular to the guide rail, an endless chain adjacent the guide rail having lugs projecting over the guide rail, said lugs projecting far enough to engage a can with its axis parallel to the guide rail but not far enough to engage a can with its axis perpendicular to the guide rail, said chain traveling in the same direction but at a rate considerably less than that of said conveying means.

3. A can-aligning machine comprising means for conveying cans along a defined path of travel, said means being inclined transversely to said path of travel, guide means adjacent the low side of the conveying means, and can turning means adjacent the guide means, said can turning means comprising a chain conveyor having lugs extending transversely therefrom for engaging cans having their axes parallel to the path of travel and turning them to a position with their axes perpendicular to the path of travel, said chain conveyor traveling at a speed less than the speed of said conveying means, and can tumbling means above the conveying means adapted to clear a can on its side but to engage a can standing on its end and tumble said can over onto its side.

4. A can-aligning machine comprising means for conveying cans from a loading station to a delivery station and defining a path of travel, said conveying means being inclined transversely to said path of travel, a guide rail adjacent the low side of said conveying means whereby said cans tend to ride against said guide rail, said guide rail being shorter than the radius of the can whereby a can with its axis parallel to the guide rail will project further over the guide rail than a can with its axis perpendicular to the guide rail, an endless chain adjacent the guide rail having lugs projecting over the guide rail, said lugs projecting far enough to engage a can with its axis parallel to the guide rail but not far enough to engage a can with its axis perpendicular to the guide rail, said chain traveling in the same direction but at a rate considerably less than that of said conveying means, and can tumbling means above the conveying means adapted to clear a can on its side but to engage a can standing on its end and tumble said can over onto its side.

5. A can-aligning machine comprising means for conveying cans along a defined path of travel, said means being inclined transversely to said path of travel, means adjacent the low side of said conveying means for engaging cans having their axes parallel to the path of travel, can tumbling means above the conveying means adapted to clear a can on its side but to engage a can standing on its end and tumble said can over onto its side, and guide means adjacent both the high and low side of said conveying means for guiding cans under said tumbling means.

6. A can-aligning machine comprising means for conveying cans along a defined path of travel, said means being inclined transversely to said path of travel, a chain conveyor adjacent the low side of said conveying means having lugs extending transversely therefrom for engaging cans having their axes parallel to the path of travel and turning them to a position with their axes perpendicular to the path of travel, said chain conveyor traveling at a speed less than the speed of said conveying means, can tumbling means above the conveying means adapted to clear a can on its side but to engage a can standing on its end and tumble said can over onto its side, and guide means adjacent both the high and low side of said conveying means for guiding cans under said tumbling means.

7. A can-aligning machine comprising means for conveying cans along a defined path of travel, said means being inclined transversely to said path of travel, guide means adjacent the low side of the conveying means, and can turning means adjacent the guide means, said can turning means comprising a chain conveyor having lugs extending transversely therefrom for engaging cans having their axes parallel to the path of travel and turning them to a position with their axes perpendicular to the path of travel, said chain conveyor traveling at a speed less than the speed of said conveying means, can tumbling means above the conveying means adapted to clear a can on its side but to engage a can standing on its end and tumble said can over onto its side and guide means adjacent both the high and low side of said conveying means for guiding cans under said tumbling means.

8. A can-aligning machine comprising means for conveying cans from a loading station to a delivery station and defining a path of travel, said conveying means being inclined transversely to said path of travel, a guide rail adjacent the low side of said conveying means whereby said cans tend to ride against said guide rail, said guide rail being shorter than the radius of the can whereby a can with its axis parallel to the guide rail will project further over the guide rail than a can with its axis perpendicular to the guide rail, an endless chain adjacent to guide rail having lugs projecting over the guide rail, said lugs projecting far enough to engage a can with its axis parallel to the guide rail but not far enough to engage a can with its axis perpendicular to the guide rail, said chain traveling in the same direction but at a rate considerably less than that of said conveying means, can tumbling means above the conveying means adapted to clear a can on its side but to engage a can standing on its end and tumble said can over onto its side, and guide means adjacent both the high and low side of said conveying means for guiding cans under said tumbling means.

9. A device for aligning empty cans having their bottoms already attached but their tops open, comprising means for conveying cans along a defined path of travel, said means being inclined transversely to said path of travel, guide means adjacent the low side of the conveying means, can turning means adjacent the guide means, said can turning means comprising a chain conveyor having lugs extending transversely therefrom for engaging cans having their axes parallel to the path of travel and turning them to a position with their axes perpendicular to the path of travel, said chain conveyor traveling at a speed less than the speed of said conveying means, and a balancing edge adjacent the delivery end of said conveying means whereby the cans issuing from said conveying means with their axes transverse to said conveying means will be engaged at their midpoint by said edge and be separated into two streams of cans one on either side of said balancing edge wherein each of the cans will be aligned with its open end up.

10. A device for aligning empty cans having their bottoms already attached but their tops open, comprising means for conveying cans from a loading station to a delivery station and defining a path of travel, said conveying means being inclined transversely to said path of travel, a guide rail adjacent the low side of said conveying means whereby said cans tend to ride against said guide rail, said guide rail being shorter than the radius of the can whereby a can with its axis parallel to the guide rail will project further over the guide rail than a can with its axis perendicular to the guide rail, an endless chain adjacent the guide rail having lugs projecting over the guide rail, said lugs projecing far enough to engage a can with its axis parallel to the guide rail but not far enough to engage a can with its axis perpendicular to the guide rail, said chain traveling in the same direction but at a rate considerably less than that of said conveying means, and a balancing edge adjacent the delivery end of said conveying means whereby the cans issuing from said conveying means with their axes transverse to said conveying means will be engaged at their midpoint by said edge and be separated into two streams of cans one on either side of said balancing edge wherein each of the cans will be aligned with its open end up.

11. A device for aligning empty cans having their bottoms already attached but their tops open, comprising means for conveying cans along a defined path of travel, said means being inclined transversely to said path of travel, guide means adjacent the low side of the conveying means, can turning means adjacent the guide means, said can turning means comprising a chain conveyor having lugs extending transversely therefrom for engaging cans having their axes parallel to the path of travel and turning them to a position with their axes perpendicular to the path of travel, said chain conveyor traveling at a speed less than the speed of said conveying means, can tumbling means above the conveying means adapted to clear a can on its side but to engage a can standing on its end and tumble said can over onto its side, and a balancing edge adjacent the delivery end of said conveying means whereby the cans issuing from said conveying means with their axes transverse to said conveying means will be engaged at their midpoint by said edge and be separated into two streams of cans one on either side of said balancing edge wherein each of the cans will be aligned with its open end up.

12. A device for aligning empty cans having their bottoms already attached but their tops open, comprising means for conveying cans from a loading station to a delivery station and defining a path of travel, said conveying means being inclined transversely to said path of travel, a guide rail adjacent the low side of said conveying means whereby said cans tend to ride against said guide rail, said guide rail being shorter than the radius of the can whereby a can with its axis parallel to the guide rail will project further over the guide rail than a can with its axis perpendicular to the guide rail, an endless chain adjacent the guide rail having lugs projecting over the guide rail, said lugs projecting far enough to engage a can with its axis parallel to the guide rail but not far enough to engage a can with its axis perpendicular to the guide rail, said chain traveling in the same direction but at a rate considerably less than that of said conveying means, can tumbling means above the conveying means adapted to clear a can on its side but to engage a can standing on its end and tumble said can over onto its side, and a balancing edge adjacent the delivery end of said conveying means whereby the cans issuing from said conveying means with their axes transverse to said conveying means will be engaged at their midpoint by said edge and be separated into two streams of cans one on either side of said balancing edge wherein each of the cans will be aligned with its open end up.

References Cited in the file of this patent
UNITED STATES PATENTS

| | | |
|---|---|---|
| 1,212,011 | Brugmann | Jan. 9, 1917 |
| 1,865,086 | Cutler | June 28, 1932 |
| 1,886,896 | Nelson | Nov. 8, 1932 |
| 1,932,529 | Nagy | Oct. 31, 1933 |
| 2,515,166 | Wadleigh | July 11, 1950 |
| 2,583,707 | Prickett | Jan. 29, 1952 |
| 2,586,523 | Dudley | Feb. 19, 1952 |